US012664259B2

(12) United States Patent
Bisheh Niasar et al.

(10) Patent No.: US 12,664,259 B2
(45) Date of Patent: Jun. 23, 2026

(54) SCALAR MASKING COUNTERMEASURE

(71) Applicant: Microsoft Technology Licensing, LLC, Redmond, WA (US)

(72) Inventors: Mojtaba Bisheh Niasar, Ithaca, NY (US); Bharat S. Pillilli, El Dorado Hills, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 215 days.

(21) Appl. No.: 18/427,160

(22) Filed: Jan. 30, 2024

(65) Prior Publication Data

US 2025/0247229 A1      Jul. 31, 2025

(51) Int. Cl.
| | |
|---|---|
| *G06F 21/55* | (2013.01) |
| *G06F 7/501* | (2006.01) |
| *G06F 21/75* | (2013.01) |
| *H04L 9/08* | (2006.01) |
| *H04L 9/30* | (2006.01) |

(52) U.S. Cl.
CPC .............. *G06F 21/55* (2013.01); *G06F 7/501* (2013.01); *G06F 21/556* (2013.01); *G06F 21/755* (2017.08); *H04L 9/0869* (2013.01); *H04L 9/0894* (2013.01); *H04L 9/3066* (2013.01); *H04L 9/3033* (2013.01); *H04L 9/304* (2013.01)

(58) Field of Classification Search
CPC . H04L 63/08; H04L 63/0869; H04L 63/0894; H04L 63/30; H04L 63/3066; H04L 63/304; H04L 63/3033; H04L 63/003; G06F 7/501; G06F 7/722; G06F 21/55; G06F 21/75; G06F 21/755
See application file for complete search history.

(56) References Cited

U.S. PATENT DOCUMENTS

| | | | | |
|---|---|---|---|---|
| 9,584,320 | B1 * | 2/2017 | Parkinson | H04L 9/3066 |
| 2016/0248585 | A1 * | 8/2016 | Yajima | H04L 9/3066 |
| 2017/0187529 | A1 * | 6/2017 | Guilley | H04L 9/14 |
| 2019/0007219 | A1 * | 1/2019 | Ghosh | H04L 9/3252 |
| 2023/0030316 | A1 * | 2/2023 | Pessl | G06F 21/75 |
| 2023/0195943 | A1 * | 6/2023 | Wu | G06F 21/602 |
| | | | | 713/189 |
| 2025/0038995 | A1 * | 1/2025 | Bisheh Niasar | H04L 9/0869 |

OTHER PUBLICATIONS

"Tawalbeh et al., Towards Secure Communications: Review of Side Channel Attacks and Countermeasures on ECC, 2016, pp. 87-91" (Year: 2016).*

* cited by examiner

*Primary Examiner* — Shaqueal D Wade-Wright
(74) *Attorney, Agent, or Firm* — Schwegman Lundberg & Woessner, P.A.

(57) ABSTRACT

Generally discussed herein are devices, systems, and methods for secure elliptic curve cryptography (ECC) operation. A circuit can include a multiplier coupled to receive a radix of a group order and a radix of a random number and generate a product based on the group order and the random number, a first adder coupled to receive the product and contents of an accumulator and generate a sum based on the product and the contents, the accumulator coupled to receive the sum, and a second adder coupled to operate in parallel with the multiplier and the first adder, the second adder coupled to receive a radix of a secret key and a radix of the contents and generate a portion of a randomized secret key based on the secret key and the contents.

20 Claims, 4 Drawing Sheets

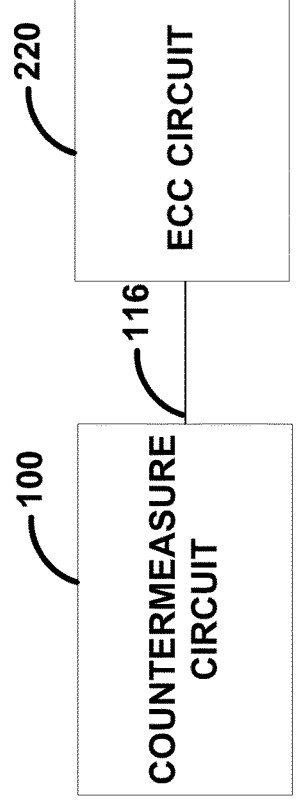
*FIG. 2*

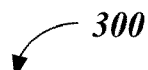

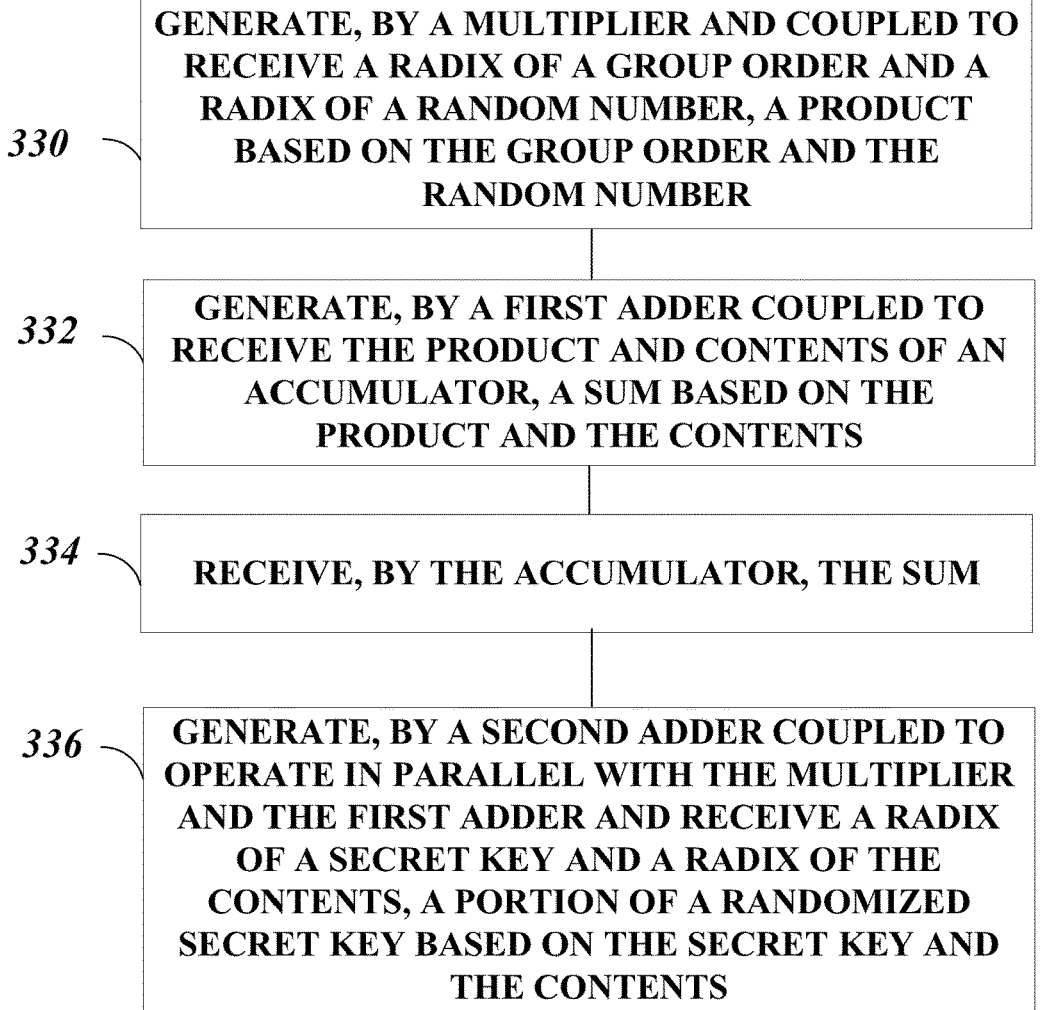

*330* — GENERATE, BY A MULTIPLIER AND COUPLED TO RECEIVE A RADIX OF A GROUP ORDER AND A RADIX OF A RANDOM NUMBER, A PRODUCT BASED ON THE GROUP ORDER AND THE RANDOM NUMBER

*332* — GENERATE, BY A FIRST ADDER COUPLED TO RECEIVE THE PRODUCT AND CONTENTS OF AN ACCUMULATOR, A SUM BASED ON THE PRODUCT AND THE CONTENTS

*334* — RECEIVE, BY THE ACCUMULATOR, THE SUM

*336* — GENERATE, BY A SECOND ADDER COUPLED TO OPERATE IN PARALLEL WITH THE MULTIPLIER AND THE FIRST ADDER AND RECEIVE A RADIX OF A SECRET KEY AND A RADIX OF THE CONTENTS, A PORTION OF A RANDOMIZED SECRET KEY BASED ON THE SECRET KEY AND THE CONTENTS

*FIG. 3*

SCALAR MASKING COUNTERMEASURE

BACKGROUND

Side-Channel Analysis (SCA) attacks expose a secret key of a cryptographic algorithm. SCA operates by exploiting observable data, sometimes called side-channel measurements, from a device running the cryptographic algorithm. Countermeasures reduce a link between the secret key and the side-channel measurements but require additional compute resources and incur additional time costs.

Scalar masking is a well-known technique to protect a type of cryptographic algorithm known as elliptic curve cryptography (ECC) from side-channel attacks. Scalar masking requires a non-modular multiplier to perform a large integer multiplication. Such a multiplier draws a large amount of current and consumes a large die area as compared to a modular or smaller integer multiplier.

SUMMARY

A method, device, system, or a machine-readable medium for are provided. An elliptic curve cryptography (ECC) countermeasure circuit can include a multiplier coupled to receive a radix of a group order and a radix of a random number. The multiplier can be configured to generate a product based on the group order and the random number.

The ECC countermeasure circuit can further include a first adder coupled to receive the product and contents of an accumulator. The first adder can be configured to generate a sum based on the product and the contents. The circuit can further include the accumulator coupled to receive the sum. The circuit can further include a second adder coupled to operate in parallel with the multiplier and the first adder. The second adder can be configured to receive a radix of a secret key and a radix of the contents. The second adder can be configured to generate a portion of a randomized secret key based on the secret key and the contents.

The accumulator can be coupled to provide the least significant bits of the contents as the radix of the contents to the second adder. The accumulator can be coupled between the first adder and the second adder. The accumulator can be configured to provide three radixes of the contents to the first adder.

The radix can be 32-bits. The portion can be least significant bits in a first iteration and second least significant bits in a second iteration. The ECC countermeasure circuit can further include a shift register storing the secret key and an array register storing the group order and the random number.

A device, machine-readable medium, method, or system can be configured to implement the functionality of the circuit and ECC operations.

BRIEF DESCRIPTION OF DRAWINGS

FIG. 2 illustrates, by way of example, a diagram of an embodiment of a system for SCA-protected ECC operation.

FIG. 3 illustrates, by way of example, a block diagram of an embodiment of a method for secure ECC operations.

DETAILED DESCRIPTION

Figure 1:
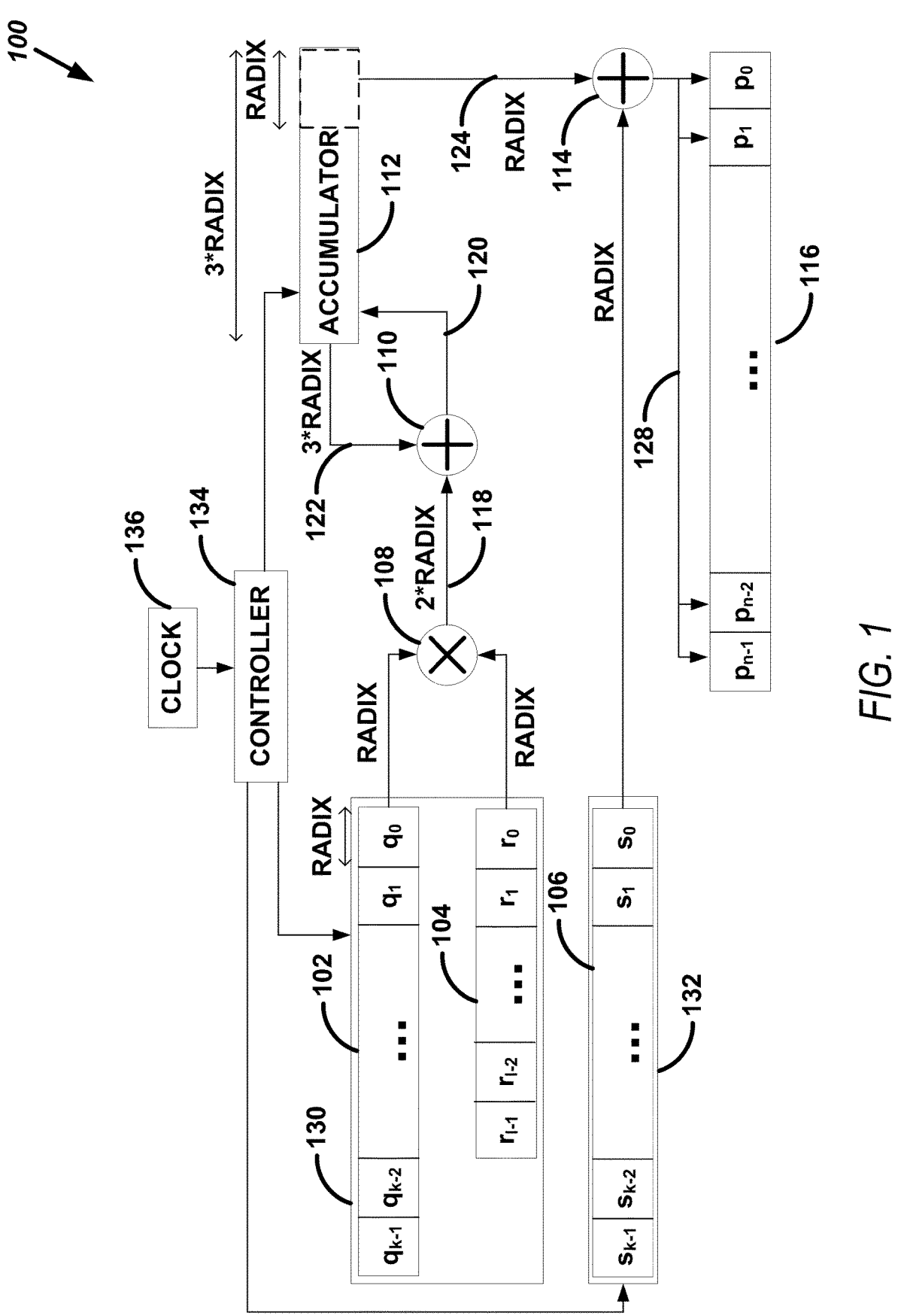
FIG. 1 illustrates, by way of example, a circuit diagram of an embodiment of a scalar masking countermeasure circuit.

In the following description, reference is made to the accompanying drawings that form a part hereof, and in which is shown by way of illustration specific embodiments which may be practiced. These embodiments are described in sufficient detail to enable those skilled in the art to practice the embodiments. It is to be understood that other embodiments may be utilized and that structural, logical, and/or electrical changes may be made without departing from the scope of the embodiments. The following description of embodiments is, therefore, not to be taken in a limited sense, and the scope of the embodiments is defined by the appended claims.

Embodiments provide a lightweight hardware architecture that reduces additional compute resource requirements and time latency in providing scalar masking for elliptic curve cryptography (ECC). An ECC architecture that is resilient to SCA attacks can use extra countermeasures to resist a particular type of SCA attack called differential power analysis (DPA) attacks. The DPA attacks attempt to identify the secret key based on a difference between observable signals of the cryptographic algorithm. One countermeasure is masking the scalar (sometimes called a "private key"). Masking the scalar randomizes the value of the scalar of an elliptic curve point multiplication used in ECC. Masking the scalar can include adding a multiple of a group order of the ECC to the scalar. Such masking avoids a data dependency between a swap function in a Montgomery ladder and a corresponding bit in the scalar. The Montgomery ladder is a method of computing scalar multiples of points on a broad class of elliptic curves.

In mathematical terms, masking the scalar can operate as follows: randomized_scalar=scalar+random_value*group_order. The scalar is the secret key. The group order is fixed according to a standard and is represented by "q" or "E". For example, the National Institute of Standards and Technology (NIST) standard P384 defines a group order of 384 bits, but there are other curves and standards for the group order. The random value can be generated by a random number generator (RNG). The random value can include at least half the number of bits of the group order. Current scalar masking techniques with different group orders are not operable on the same hardware because the operation of scalar masking is non-modular.

An improved countermeasure circuit provides a scalar masking countermeasure that balances resource considerations, security considerations, and timing considerations to improve upon prior scalar masking techniques.

Resource considerations: A multiplication between random_value and group_order is required for scalar masking in ECC. Since this multiplication operation is non-modular and other multiplications in ECC are modular, the multiplication circuits in hardware ECC cannot be re-used for the scalar masking. Scalar masking can thus be achieved at the cost of an ECC circuit that includes a larger hardware footprint and power consumption. A goal of scalar masking circuits can thus be to reduce the hardware footprint and power consumption as much as possible. The improved countermeasure circuit includes a multiplier that reduces the hardware footprint and power consumption as compared to prior scalar masking circuits.

Security considerations: There are some DPA attacks that do not attack the ECC scalar multiplication itself, but instead attack scalar masking circuitry to determine the secret key. The improved countermeasure circuit includes scalar masking circuitry and operations that do not provide any information leakage that is useful for SCA attacks.

Timing consideration: There are two large integer operations in scalar masking. The large integer operations include (i) multiplication between k-bit and k/2-bit values that results in 3 k/2-bit product, and (ii) a large integer addition between k-bit scalar and 3 k/2-bit product. Normally, these operations are time intensive. The improved countermeasure circuit includes an optimization from a timing perspective. The improved countermeasure circuit includes a parallelized addition and multiplication that reduces the timing overhead of performing the scalar masking as compared to prior scalar masking techniques.

FIG. 1 illustrates, by way of example, a circuit diagram of an embodiment of a scalar masking countermeasure circuit 100. The scalar masking circuit 100 as illustrated includes a non-modular multiplier 108, a non-modular adder 110 electrically in series with the multiplier 108, an accumulator 112 electrically in series with the multiplier 108 and the adder 110, and an adder 114 electrically in series with the multiplier 108 and the adder 110.

The multiplier 108 is coupled to receive a radix of the group order 102 and a corresponding radix of a random value 104. The multiplier 108 performs a non-modular multiplication of the radix of a group order 102 and a corresponding radix of a random value 104, resulting in a product 118. The product 118 is provided to the adder 110. A radix is a size of a chunk of data that is processed in a given iteration of processing.

The adder 110 receives the product 118 (which has $2*RADIX$ number of bits) and contents 122 of the accumulator 112. The adder 110 produces a sum 120 that is an addition of the product 118 and the contents 122 of the accumulator 112. The sum 120 is loaded into the accumulator 112.

The accumulator 112 is a register or a memory location that stores intermediate results of scalar masking. The accumulator 112 can store $3*radix$ number of bits. The least significant radix number of bits (LSRBs) from the accumulator 112 are provided to the adder 114. Based on the product-scanning method of multiplication, after an index, i, of the product is completed, the contents of the accumulator 112 are shifted to right by radix bits.

The adder 114 receives a radix of the secret key 106 and a radix of the contents 124 of the accumulator 112. The secret key 106 can be stored in a shift register 132 that is controlled by the controller 134. The shift register is a digital circuit that includes a cascade of flip flops that are operated based on a signal provided by a controller 134 or a clock 136. The clock 136 is used to provide timing for data transmission. There are many known types of clocks with various frequencies of operation.

The adder 114 produces a sum 128 of the radix of the secret key 106 and the radix of the contents 124. A concatenation of sums 128 from the adder 114 is a scalar masked secret key 116, sometimes called the "random scalar".

The group order 102 and random value 104 can be stored in an array register 130. An array register is a hardware component that is configured to store a collection of values in a contiguous block of hardware memory. The array register stores multiple values that are processed simultaneously. The array register provides efficient access to multiple values in a single entity.

A controller 134 can be configured to control inputs to adder 112 and multiplier 108 to perform a product-scanning method for multiplication. The product-scanning method is performed by a combination of the multiplier 108, adder 110, and accumulator 112 under control of the controller 134. The controller 134 can include electrical or electronic components configured to perform operations for implementing the product-scanning method for multiplication including providing a radix from the accumulator 112, providing contents of the accumulator 112 to the adder 110, providing inputs to the multiplier 108, causing the accumulator 112 to shift contents by a radix after removing the radix of the contents 124, among others. The electrical or electronic components can include one or more resistors, transistors, capacitors, diodes, amplifiers, inductors, memories, power supplies, analog to digital converters, digital to analog converters, logic gates (e.g., AND, OR, XOR, buffer, negate, or the like), multiplexers, switches, a combination thereof, or the like.

How the circuit 100 provides optimization of the security, timing, and resource considerations discussed previously is now discussed in more detail with respect to an example that assumes the radix is 32 bits. Assume that all operands are presented in radix=32-bit format. Only one 32-bit multiplier 108 is used in the circuit 100. The one small multiplier (relative to higher-bit multipliers) reduces circuit area overhead.

The multiplication performed by the circuit 100, and controlled by the controller 134, is implemented in a product-scanning method from least significant radix (LSR) to most significant radix (MSR). Product-scanning is a way to perform a multi-precision multiplication. Product-scanning is sometimes called column-wise multiplication. In product-scanning, each partial product is processed in a column-wise approach. This has several advantages. First, since all operands of each column are multiplied and added consecutively (within a multiply-accumulate approach), a final word of the result is obtained for each column. Thus, no intermediate results have to be stored or loaded throughout the product-scanning process. Also, the handling of carry propagation is very easy because the carry can be simply added to the result of the next column using a simple register-copy operation. Second, only four working registers are needed to perform the multiplication: two registers for the operand and multiplicand and two registers for accumulation and results. This makes the method very suitable for low-resource devices with limited registers.

The circuit 100 uses an accumulator 112 with $3*RADIX$ width that operates at the same time as the multiplier 108. Such a configuration helps to reduce the latency of operating the accumulator 112 and the adder 110 after the multiplier 108. The accumulator 112 can operate on results of a prior iteration while the multiplier 108 operates in a current iteration, thus allowing them to operate at the same time.

The simultaneous computation of the multiplier 108 and the adder 114 makes the power consumption complex. Complex in this instance means that the power consumption is not just due to the operation multiplier and is instead due to the operation of multiple modules (a multiplier and an adder). The complex power consumption makes it difficult, if not impossible, to determine the correlation between the scalar 106 and the power consumption.

For more security, the random scalar or randomized scalar (remember the scalar is sometimes called the secret key) can be further masked. The masking can include splitting the scalar into two portions and then performing the scalar randomization twice. Masking the scalar can be explained in mathematical terms as follows:

randomized_scalar=scalar+random_value*group_order=
  (scalar_portion_0+scalar_portion_1)+(random_
  value_portion_0+random_value_portion_1)*
  group_order=(scalar_portion_0+
  random_value_portion_0*group_order)+(scalar_por-
  tion_1+random_value_portion_1*group_order).

To determine each portion of the randomized scalar, two instances of the circuit 100 can operate in parallel and receive the (i) scalar_portion_0 and random_value_portion_0 and (ii) scalar_portion_1 and random_value_portion_1, respectively or a single instance of the circuit 100 can operate to determine (i) and (ii) consecutively.

The additional cost of operating the countermeasure circuit 100 to determine a randomized scalar (or a randomized portion of a scalar) is as follows:

Require one radix-bit multiplier, one 3*radix-bit adder, one radix-bit adder, and one 3*radix-bit accumulator.

Compute the output in (k+1)*(1+1) cycles. For k=384 and radix=32, the total latency cost is less than 0.01% overhead or 110 total cycles.

The parallel computation of multiplication with random value and addition protect the circuit 100 from power consumption leakage. The circuit 100 provides a lightweight randomized scalar architecture, which can offer more protection against side-channel information leakage. The circuit 100 provides a secure architecture for ECC scalar randomization that can be optimized and mapped to different platforms to develop a SCA-protected ECC architecture. The circuit 100 provides the improvement by having the multiplier and the adder operating in parallel, thus reducing the correlation between the randomized secret key and the information leaked by probing the circuit 100. Prior countermeasure circuits do not include such parallelization and thus a correlation between the power consumption and the secret key was higher. The higher correlation increases a likelihood that the secret key is discernible based on the power consumption information.

FIG. 2 illustrates, by way of example, a diagram of an embodiment of a system 200 for SCA-protected ECC operation. The system 200 as illustrated includes the scalar masking countermeasure circuit 100 and an ECC circuit 220. The countermeasure circuit 100 randomizes the scalar (or portions of the scalar) and provides the randomized scalar 116 to the ECC circuit 220. The ECC circuit 220 operates on the randomized scalar 116 as the secret key in performing ECC operations. There are many known implementations of the ECC circuit 220. The ECC circuit 220 performs public key cryptography using ECC techniques. Encryption, authentication, and digital signatures can be provided using the ECC circuit 220. Adding the countermeasure countermeasure circuit 100 to the ECC circuit 220 makes the operations of the ECC circuit 220 more secure since the secret key is randomized to different values between iterations, thus making the randomized scalar 116 different between operations. The changing of the randomized scalar 116 reduces the correlation between the secret key and the randomized scalar 116 thus reducing the possibility of determining the secret key using SCA.

A high-level description of ECC is now provided. An elliptic curve is not an ellipse, or oval shape. Rather, an elliptic curve is a looping line intersecting two axes. Axes are lines on a graph used to indicate the position of a point. The elliptic curve is symmetric, or mirrored, along the x-axis of the graph.

Public key cryptography systems, like ECC implemented by the ECC circuit 220, use a mathematical process to merge two distinct keys and then use the output to encrypt and decrypt data. One key is a public key that is known to anyone, and the other is a private key (sometimes called a "secret key") that is only known by the sender and receiver of the data.

ECC generates keys through the properties of an elliptic curve equation instead of the traditional method of generation as the product of large prime numbers. From a cryptographic perspective, the points along the graph can be formulated using the following equation: $y^2=x^3+ax+b$ ECC uses the concept of a one-way, or trapdoor, function. This means that a mathematical equation with a public and private key can be used to easily get from point A to point B. But, without knowing the private key and depending on the key size used, getting from B to A is difficult, if not impossible, to achieve.

ECC is based on the properties of a set of values for which operations can be performed on any two members of a group to produce a third member, which is derived from points where the line intersects the axes. Multiplying a point on the curve by a number produces another point on the curve (C). Taking point C and bringing it to the mirrored point on the opposite side of the x-axis produces point D. From here, a line is drawn back to an original point A, creating an intersection at point E. This process can be completed n number of times within a defined max value. The n is the private key value, which indicates how many times the equation should be run, ending on the final value that is used to encrypt and decrypt data. The maximum defined value of the equation relates to the key size used.

FIG. 3 illustrates, by way of example, a block diagram of an embodiment of a method 300 for secure ECC operations. The method 300 as illustrated includes generating, by a multiplier and coupled to receive a radix of a group order and a radix of a random number, a product based on the group order and the random number, at operation 330; generating, by a first adder coupled to receive the product and contents of an accumulator, a sum based on the product and the contents, at operation 332; receiving, by the accumulator, the sum, at operation 334; and generating, by a second adder coupled to operate in parallel with the multiplier and the first adder and receive a radix of a secret key and a radix of the contents, a portion of a randomized secret key based on the secret key and the contents, at operation 336.

The method 300 can further include providing, by the accumulator, the least significant bits of the contents as the radix of the contents to the second adder. The accumulator can be coupled between the first adder and the second adder. The accumulator can be configured to provide three radixes of the contents to the first adder. The radix can be 32-bits.

The portion can least significant bits in a first iteration and second least significant bits in a second iteration. The method 300 can further include storing, by a shift register, the secret key, and storing, by an array register, the group order and the random number.

Figure 4:
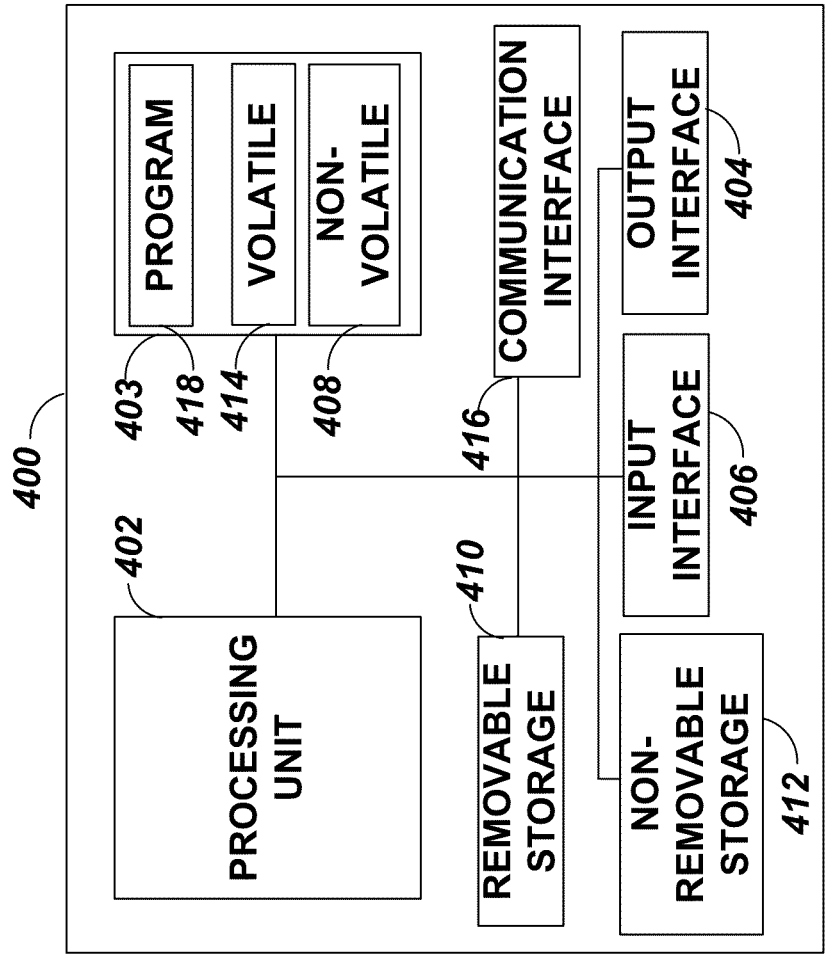
FIG. 4 illustrates, by way of example, a block diagram of an embodiment of a machine (e.g., a computer system) to implement one or more embodiments.

FIG. 4 illustrates, by way of example, a block diagram of an embodiment of a machine 400 (e.g., a computer system) to implement one or more embodiments. The machine 400 can implement a technique for secure and efficient ECC operation. Any of the circuit 100, ECC circuit 220, method 300 or a component or operation thereof can include one or more of the components of the machine 400. One or more of the circuit 100, ECC circuit 220, method 300, or a component or operations thereof can be implemented, at least in part, using a component of the machine 400. One example machine 400 (in the form of a computer), may include a processing unit 402, memory 403, removable storage 410, and non-removable storage 412. Although the example computing device is illustrated and described as machine 400, the computing device may be in different forms in different embodiments. For example, the computing device may instead be a smartphone, a tablet, smartwatch, or other computing device including the same or similar elements as illustrated and described regarding FIG. 4. Devices such as smartphones, tablets, and smartwatches are generally collectively referred to as mobile devices. Further, although the various data storage elements are illustrated as part of the machine 400, the storage may also or alternatively include cloud-based storage accessible via a network, such as the Internet.

Memory 403 may include volatile memory 414 and non-volatile memory 408. The machine 400 may include- or have access to a computing environment that includes-a variety of computer-readable media, such as volatile memory 414 and non-volatile memory 408, removable storage 410 and non-removable storage 412. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices capable of storing computer-readable instructions for execution to perform functions described herein.

The machine 400 may include or have access to a computing environment that includes input 406, output 404, and a communication connection 416. Output 404 may include a display device, such as a touchscreen, that also may serve as an input device. The input 406 may include one or more of a touchscreen, touchpad, mouse, keyboard, camera, one or more device-specific buttons, one or more sensors integrated within or coupled via wired or wireless data connections to the machine 400, and other input devices. The computer may operate in a networked environment using a communication connection to connect to one or more remote computers, such as database servers, including cloud-based servers and storage. The remote computer may include a personal computer (PC), server, router, network PC, a peer device or other common network node, or the like. The communication connection may include a Local Area Network (LAN), a Wide Area Network (WAN), cellular, Institute of Electrical and Electronics Engineers (IEEE) 802.11 (Wi-Fi), Bluetooth, or other networks.

Computer-readable instructions stored on a computer-readable storage device are executable by the processing unit 402 (sometimes called processing circuitry) of the machine 400. A hard drive, CD-ROM, and RAM are some examples of articles including a non-transitory computer-readable medium such as a storage device. For example, a computer program 418 may be used to cause processing unit 402 to perform one or more methods or algorithms described herein.

The operations, functions, or algorithms described herein may be implemented in software in some embodiments. The software may include computer executable instructions stored on computer or other machine-readable media or storage device, such as one or more non-transitory memories (e.g., a non-transitory machine-readable medium) or other type of hardware based storage devices, either local or networked. Further, such functions may correspond to subsystems, which may be software, hardware, firmware, or a combination thereof. Multiple functions may be performed in one or more subsystems as desired, and the embodiments described are merely examples. The software may be executed on a digital signal processor, ASIC, microprocessor, central processing unit (CPU), graphics processing unit (GPU), field programmable gate array (FPGA), or other type of processor operating on a computer system, such as a personal computer, server or other computer system, turning such computer system into a specifically programmed machine. The functions or algorithms may be implemented using processing circuitry, such as may include electric and/or electronic components (e.g., one or more transistors, resistors, capacitors, inductors, amplifiers, modulators, demodulators, antennas, radios, regulators, diodes, oscillators, multiplexers, logic gates, buffers, caches, memories, GPUs, CPUs, field programmable gate arrays (FPGAs), or the like). Additional Notes and Examples Example 1 includes an elliptic curve cryptography (ECC) countermeasure circuit comprising a multiplier coupled to receive a radix of a group order and a radix of a random number and generate a product based on the group order and the random number, a first adder coupled to receive the product and contents of an accumulator and generate a sum based on the product and the contents, the accumulator coupled to receive the sum, and a second adder coupled to operate in parallel with the multiplier and the first adder, the second adder coupled to receive a radix of a secret key and a radix of the contents and generate a portion of a randomized secret key based on the secret key and the contents.

In Example 2, Example 1 further includes, wherein the accumulator is coupled to provide the least significant bits of the contents as the radix of the contents to the second adder.

In Example 3, Example 2 further includes, wherein the accumulator is coupled between the first adder and the second adder.

In Example 4, Example 3 further includes, wherein the accumulator is configured to provide three radixes of the contents to the first adder.

In Example 5, at least one of Examples 1-4 further includes, wherein the radix is 32-bits.

In Example 6, at least one of Examples 1-5 further includes, wherein the portion is least significant bits in a first iteration and second least significant bits in a second iteration.

In Example 7, at least one of Examples 1-6 further includes a shift register storing the secret key and an array register storing the group order and the random number.

Example 8 includes an elliptic curve cryptography (ECC) countermeasure method comprising generating, by a multiplier and coupled to receive a radix of a group order and a radix of a random number, a product based on the group order and the random number, generating, by a first adder coupled to receive the product and contents of an accumulator, a sum based on the product and the contents, receiving, by the accumulator, the sum, and generating, by a second adder coupled to operate in parallel with the multiplier and the first adder and receive a radix of a secret key and a radix of the contents, a portion of a randomized secret key based on the secret key and the contents.

In Example 9, Example 8 further includes providing, by the accumulator, the least significant bits of the contents as the radix of the contents to the second adder.

In Example 10, Example 9 further includes, wherein the accumulator is coupled between the first adder and the second adder.

In Example 11, Example 10 further includes, wherein the accumulator is configured to provide three radixes of the contents to the first adder.

In Example 12, at least one of Examples 8-11 further includes, wherein the radix is 32-bits.

In Example 13, at least one of Examples 8-12 further includes, wherein the portion is least significant bits in a first iteration and second least significant bits in a second iteration.

In Example 14, at least one of Examples 8-13 further includes storing, by a shift register, the secret key, and storing, by an array register, the group order and the random number.

Example 15 includes an elliptic curve cryptography (ECC) system comprising an ECC countermeasure circuit comprising a multiplier coupled to receive a radix of a group order and a radix of a random number and generate a product based on the group order and the random number, a first adder coupled to receive the product and contents of an accumulator and generate a sum based on the product and the contents, and a second adder coupled to operate in parallel with the multiplier and the first adder, the second adder coupled to receive a radix of a secret key and a radix of the contents and generate a portion of a randomized secret key based on the secret key and the contents, and an ECC circuit coupled to receive the portion of the randomized secret key and implement ECC operations based on the portion of the randomized secret key.

In Example 16, Example 15 further includes the accumulator, the accumulator coupled to receive the sum and provide the least significant bits of the contents as the radix of the contents to the second adder.

In Example 17, Example 16 further includes, wherein the accumulator is coupled between the first adder and the second adder.

In Example 18, Example 17 further includes, wherein the accumulator is configured to provide three radixes of the contents to the first adder.

In Example 19, at least one of Examples 15-18 further includes, wherein the portion is least significant bits in a first iteration and second least significant bits in a second iteration.

In Example 20, at least one of Examples 15-19 further includes a shift register storing the secret key, and an array register storing the group order and the random number.

Although a few embodiments have been described in detail above, other modifications are possible. For example, the logic flows depicted in the figures do not require the order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. An elliptic curve cryptography (ECC) countermeasure circuit comprising:
   a multiplier coupled to receive a radix of a group order and a radix of a random number and generate a product based on the group order and the random number;
   a first adder coupled to receive the product and contents of an accumulator and generate a sum based on the product and the contents;
   the accumulator coupled to receive the sum; and
   a second adder coupled to operate in parallel with the multiplier and the first adder, the second adder coupled to receive a radix of a secret key and a radix of the contents and generate a portion of a randomized secret key based on the secret key and the contents, the portion of the randomized secret key acts as a countermeasure from side channel analysis attacks.

2. The ECC countermeasure circuit of claim 1, wherein the accumulator is coupled to provide least significant bits of the contents as the radix of the contents to the second adder.

3. The ECC countermeasure circuit of claim 2, wherein the accumulator is coupled between the first adder and the second adder.

4. The ECC countermeasure circuit of claim 3, wherein the accumulator is configured to provide three radixes of the contents to the first adder.

5. The ECC countermeasure circuit of claim 1, wherein the radix is 32-bits.

6. The ECC countermeasure circuit of claim 1, wherein the portion is least significant bits in a first iteration and second least significant bits in a second iteration.

7. The ECC countermeasure circuit of claim 1, further comprising a shift register storing the secret key and an array register storing the group order and the random number.

8. An elliptic curve cryptography (ECC) countermeasure method comprising:
   generating, by a multiplier and coupled to receive a radix of a group order and a radix of a random number, a product based on the group order and the random number;
   generating, by a first adder coupled to receive the product and contents of an accumulator, a sum based on the product and the contents;
   receiving, by the accumulator, the sum; and
   generating, by a second adder coupled to operate in parallel with the multiplier and the first adder and receive a radix of a secret key and a radix of the contents, a portion of a randomized secret key based on the secret key and the contents, the portion of the randomized secret key acts as a countermeasure from side channel analysis attacks.

9. The method of claim 8, further comprising providing, by the accumulator, least significant bits of the contents as the radix of the contents to the second adder.

10. The method of claim 9, wherein the accumulator is coupled between the first adder and the second adder.

11. The method of claim 10, wherein the accumulator is configured to provide three radixes of the contents to the first adder.

12. The method of claim 8, wherein the radix is 32-bits.

13. The method of claim 8, wherein the portion is least significant bits in a first iteration and second least significant bits in a second iteration.

14. The method of claim 8, further comprising:
   storing, by a shift register, the secret key; and
   storing, by an array register, the group order and the random number.

15. An elliptic curve cryptography (ECC) system comprising:
   an ECC countermeasure circuit comprising:
   a multiplier coupled to receive a radix of a group order and a radix of a random number and generate a product based on the group order and the random number;
   a first adder coupled to receive the product and contents of an accumulator and generate a sum based on the product and the contents; and
   a second adder coupled to operate in parallel with the multiplier and the first adder, the second adder coupled to receive a radix of a secret key and a radix of the contents and generate a portion of a randomized secret key based on the secret key and the contents, the portion of the randomized secret key acts as a countermeasure from side channel analysis attacks; and
   an ECC circuit coupled to receive the portion of the randomized secret key and implement ECC operations based on the portion of the randomized secret key.

16. The ECC system of claim 15, further comprising the accumulator, the accumulator coupled to receive the sum and provide least significant bits of the contents as the radix of the contents to the second adder.

17. The ECC system of claim 16, wherein the accumulator is coupled between the first adder and the second adder.

18. The ECC system claim 17, wherein the accumulator is configured to provide three radixes of the contents to the first adder.

19. The ECC system of claim 15, wherein the portion is least significant bits in a first iteration and second least significant bits in a second iteration.

20. The ECC system of claim 15, further comprising:

a shift register storing the secret key; and an array register storing the group order and the random number.

\* \* \* \* \*